United States Patent
Ucar et al.

(10) Patent No.: US 12,258,045 B2
(45) Date of Patent: Mar. 25, 2025

(54) SYSTEMS AND METHODS FOR VEHICULAR-NETWORK-ASSISTED FEDERATED MACHINE LEARNING

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Chang-Heng Wang, Mountain View, CA (US); Enes Krijestorac, Los Angeles, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 371 days.

(21) Appl. No.: 17/168,406

(22) Filed: Feb. 5, 2021

(65) Prior Publication Data
US 2022/0250656 A1    Aug. 11, 2022

(51) Int. Cl.
*B60W 60/00* (2020.01)
*G01C 21/34* (2006.01)
(Continued)

(52) U.S. Cl.
CPC ..... *B60W 60/00184* (2020.02); *G01C 21/343* (2013.01); *G06F 18/214* (2023.01);
(Continued)

(58) Field of Classification Search
CPC ........... B60W 60/00184; G01C 21/343; G01C 21/3407; G06F 18/214; G06F 18/2148; G06N 20/00; G06V 20/56; H04W 4/46
See application file for complete search history.

(56) References Cited

U.S. PATENT DOCUMENTS

| | | | |
|---|---|---|---|
| 2018/0191867 A1* | 7/2018 | Siebel | G06N 20/20 |
| 2020/0017117 A1* | 1/2020 | Milton | G08G 1/0112 |

(Continued)

FOREIGN PATENT DOCUMENTS

WO    2020115273 A1    6/2020

OTHER PUBLICATIONS

Hao Ye et al. "Machine Learning for Vehicular Networks: Recent Advances and Application Examples," IEEE Vehicular Technology Magazine (vol. 13, 2018, Issue: 2, pp. 94-101), (Year: 2018).*

(Continued)

*Primary Examiner* — Joan T Goodbody
(74) *Attorney, Agent, or Firm* — Christopher G. Darrow; Darrow Mustafa PC (57) ABSTRACT

Systems and methods for vehicular-network-assisted federated machine learning are disclosed herein. One embodiment transmits first metadata from a connected vehicle to at least one other connected vehicle; receives, at the connected vehicle, second metadata from the at least one other connected vehicle; receives, at the connected vehicle based on analysis of the first and second metadata, a notification that the connected vehicle has been elected to participate in the current training phase of a federated machine learning process; receives, at the connected vehicle, instructions to prepare the connected vehicle for the next training phase; trains a machine learning model to perform a task at the connected vehicle during the current training phase to produce a locally trained machine learning model; and submits the locally trained machine learning model for aggregation with at least one other locally trained machine learning model to produce an aggregated locally trained machine learning model.

16 Claims, 6 Drawing Sheets

(51) Int. Cl.
    *G06F 18/214*     (2023.01)
    *G06N 20/00*     (2019.01)
    *G06V 20/56*     (2022.01)
    *H04W 4/46*     (2018.01)

(52) U.S. Cl.
    CPC ......... *G06F 18/2148* (2023.01); *G06N 20/00* (2019.01); *G06V 20/56* (2022.01); *H04W 4/46* (2018.02)

(56) References Cited

U.S. PATENT DOCUMENTS

| | | | | |
|---|---|---|---|---|
| 2020/0027019 A1* | 1/2020 | Yang | ................ | G06Q 20/326 |
| 2022/0250656 A1* | 8/2022 | Ucar | ................ | G06V 20/56 |

OTHER PUBLICATIONS

Savazzi et al., "Federated Learning with Mutually Cooperating Devices: A Consensus Approach Towards Server-Less Model Optimization," Proceedings of the 2020 IEEE International Conference on Acoustics, Speech and Signal Processing (ICASSP), pp. 3937-3941.

Lu et al., "Federated Learning for Data Privacy Preservation in Vehicular Cyber-Physical Systems," IEEE, 2020, found at http://heim.ifi.uio.no/~yanzhang/IEEENetworkMayJune2020.pdf.

He et al., "Central Server Free Federated Learning over Single-Sided Trust Social Networks," arXiv:1910.04956v2, Aug. 1, 2020, found at https://arxiv.org/pdf/1910.04956.pdf.

Elbamby et al., "Wireless Edge Computing with Latency and Reliability Guarantees," arXiv:1905.05316v1, May 13, 2019, found at https://arxiv.org/pdf/1905.05316.pdf.

Lu et al., "Blockchain Empowered Asynchronous Federated Learning for Secure Data Sharing in Internet of Vehicles," IEEE Transactions on Vehicular Technology, vol. 69, No. 4, Apr. 2020, found at http://heim.ifi.uio.no/~yanzhang/IEEETVTApril2020c.pdf.

Samarakoon et al., "Federated Learning for Ultra-Reliable Low-Latency V2V Communications," arXiv:1805.09253v1, May 11, 2018, found at https://arxiv.org/pdf/1805.09253.pdf.

Chiu et al., "Semisupervised Distributed Learning with Non-IID Data for AIoT Service Platform," IEEE Internet of Things Journal, vol. 7, No. 10, Oct. 2020.

Du et al., "Federated Learning for Vehicular Internet of Things: Recent Advances and Open Issues," IEEE Open Journal of the Computer Society, May 6, 2020, available at https://ieeexplore.ieee.org/stamp/stamp.jsp?arnumber=9086790.

Elbir et al., "Federated Learning in Vehicular Networks," arXiv:2006.01412v2, Sep. 19, 2020, available at https://arxiv.org/pdf/2006.01412.pdf.

McMahan et al., "Communication-Efficient Learning of Deep Networks from Decentralized Data," Proceedings of the 20th International Conference on Artificial Intelligence and Statistics (AISTATS) 2017, Fort Lauderdale, Florida, USA, available at http://proceedings.mlr.press/v54/mcmahan17a/mcmahan17a.pdf.

Ye et al., "Federated Learning in Vehicular Edge Computing: A Selective Model Aggregation Approach," IEEE Access, Jan. 21, 2020, available at https://ieeexplore.ieee.org/stamp/stamp.jsp?arnumber=8964354.

Deveaux et al., "On the Orchestration of Federated Learning Through Vehicular Knowledge Networking", 2020 IEEE Vehicular Networking Conference (VNC), New York, NY, USA, 2020, pp. 1-8.

\* cited by examiner

SYSTEMS AND METHODS FOR VEHICULAR-NETWORK-ASSISTED FEDERATED MACHINE LEARNING

TECHNICAL FIELD

The subject matter described herein generally relates to vehicles and, more particularly, to systems and methods for vehicular-network-assisted federated machine learning.

BACKGROUND

Machine learning approaches train mathematical models to perform tasks such as making predictions based on input features. Autonomous vehicles and intelligent driving-assistance systems increasingly rely on machine-learning approaches to accomplish their tasks. For example, a machine learning model can be trained to recognize objects from RGB images or to predict the trajectory of external road agents (e.g., vehicles, cyclists, pedestrians, etc.) based on various types of input sensor data. Training a machine-learning model translates to optimizing its parameters to maximize the accuracy of its predictions. Model training usually requires a large amount of training data and, for vehicular applications, this data comes from vehicular onboard sensors and computers. Conventionally, machine learning models are trained by compiling the available data at a single server and performing machine-learning-model training using that available data. However, for vehicular applications, there are two main disadvantages of this centralized machine-learning approach. First, vehicular sensor and onboard computer data may contain privacy-sensitive information about vehicle owners that the vehicle owners do not want to share. Second, vehicles may have limited connectivity to a cloud server and the connection, when available, is often over a tariffed cellular communication link. Therefore, it is disadvantageous to transmit large quantities of data required for model training to a cloud server.

SUMMARY

An example of a system for vehicular-network-assisted federated machine learning is presented herein. The system comprises one or more processors and a memory communicably coupled to the one or more processors. The memory stores a federated learning module including instructions that when executed by the one or more processors cause the one or more processors to transmit, after initiation of a federated machine learning process, first metadata from a connected vehicle to at least one other connected vehicle, wherein the connected vehicle and the at least one other connected vehicle are members of a vehicular micro cloud of networked vehicles and the first metadata includes information regarding sensor capabilities of the connected vehicle. The federated learning module also includes instructions that when executed by the one or more processors cause the one or more processors to receive, at the connected vehicle, second metadata from the at least one other connected vehicle, the second metadata including information regarding sensor capabilities of the at least one other connected vehicle. The federated learning module also includes instructions that when executed by the one or more processors cause the one or more processors to receive, at the connected vehicle based on an analysis of the first and second metadata, a notification that the connected vehicle has been elected to participate in a current training phase of the federated machine learning process. The federated learning module also includes instructions that when executed by the one or more processors cause the one or more processors to receive, at the connected vehicle, instructions to prepare the connected vehicle for a next training phase of the federated machine learning process. The memory also stores a training module including instructions that when executed by the one or more processors cause the one or more processors to train a machine learning model to perform a task at the connected vehicle during the current training phase to produce a locally trained machine learning model. The memory also stores an aggregation module including instructions that when executed by the one or more processors cause the one or more processors to submit the locally trained machine learning model for aggregation with at least one other locally trained machine learning model produced by at least one other elected vehicle in the vehicular micro cloud to produce an aggregated locally trained machine learning model.

Another embodiment is a non-transitory computer-readable medium for vehicular-network-assisted federated machine learning and storing instructions that when executed by one or more processors cause the one or more processors to transmit, after initiation of a federated machine learning process, first metadata from a connected vehicle to at least one other connected vehicle, wherein the connected vehicle and the at least one other connected vehicle are members of a vehicular micro cloud of networked vehicles and the first metadata includes information regarding sensor capabilities of the connected vehicle. The instructions also cause the one or more processors to receive, at the connected vehicle, second metadata from the at least one other connected vehicle, the second metadata including information regarding sensor capabilities of the at least one other connected vehicle. The instructions also cause the one or more processors to receive, at the connected vehicle based on an analysis of the first and second metadata, a notification that the connected vehicle has been elected to participate in a current training phase of the federated machine learning process. The instructions also cause the one or more processors to receive, at the connected vehicle, instructions to prepare the connected vehicle for a next training phase of the federated machine learning process. The instructions also cause the one or more processors to train a machine learning model to perform a task at the connected vehicle during the current training phase to produce a locally trained machine learning model. The instructions also cause the one or more processors to submit the locally trained machine learning model for aggregation with at least one other locally trained machine learning model produced by at least one other elected vehicle in the vehicular micro cloud to produce an aggregated locally trained machine learning model.

In another embodiment, a method of vehicular-network-assisted federated machine learning is disclosed. The method comprises transmitting, after initiation of a federated machine learning process, first metadata from a connected vehicle to at least one other connected vehicle, wherein the connected vehicle and the at least one other connected vehicle are members of a vehicular micro cloud of networked vehicles and the first metadata includes information regarding sensor capabilities of the connected vehicle. The method also includes receiving, at the connected vehicle, second metadata from the at least one other connected vehicle, the second metadata including information regarding sensor capabilities of the at least one other connected vehicle. The method also includes receiving, at the connected vehicle based on an analysis of the first and second metadata, a notification that the connected vehicle has been elected to participate in a current training phase of the federated machine learning process. The method also includes receiving, at the connected vehicle, instructions to prepare the connected vehicle for a next training phase of the federated machine learning process. The method also includes training a machine learning model to perform a task at the connected vehicle during the current training phase to produce a locally trained machine learning model. The method also includes submitting the locally trained machine learning model for aggregation with at least one other locally trained machine learning model produced by at least one other elected vehicle in the vehicular micro cloud to produce an aggregated locally trained machine learning model.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Various embodiments disclosed herein address the two disadvantages of conventional federated learning platforms mentioned in the Background by using vehicular-network-assisted federated learning techniques. In federated learning, machine models are trained on the user (e.g., vehicle) side rather than at a cloud or edge server. Federated learning is an iterative process in which users locally train the model on their own data. The users share their locally trained models with the server, which aggregates the locally trained models and shares the global aggregated model with the users (e.g., vehicles). The global aggregated model is then a starting point for a new iteration of local training at the vehicles and aggregation at the server. One major benefit of federated learning is that the vehicles need to transmit only the model parameters to a cloud or edge server instead of their raw sensor data. This significantly reduces communication overhead and also overcomes the privacy issue.

The various embodiments disclosed herein improve upon conventional federated-learning platforms by incorporating vehicle-to-vehicle (V2V) communication such as Dedicated Short-Range Communications (DSRC), Wi-Fi, or millimeter-wave (mmWave) communication links between vehicles to increase the rate at which federated learning models can be trained and to improve their accuracy. In various embodiments, during the time between when the vehicles finish the training of their respective local models and the transmission of the locally trained models to the server for aggregation, nearby vehicles (e.g., vehicles in close proximity to one another) form a vehicular micro cloud to further collaborate via V2V connections. These embodiments include an intelligent selection mechanism to select ("elect") particular vehicles in a given vehicular micro cloud ("micro cloud") to share their locally trained models during a particular iteration or training phase. To facilitate such election, micro cloud members exchange metadata with one another regarding their respective sensor capabilities, and the approximate benefit (e.g., accuracy increase) is predicted for particular subsets of vehicles in the micro cloud, if those subsets of vehicles were to exchange their locally trained models. In some embodiments, the subset of vehicles in the micro cloud that maximizes the approximate accuracy increase is elected to exchange their locally trained models with one another. An elected subset of micro cloud members thus exchange their locally trained models through horizontal collaboration to generate an aggregated locally trained machine learning model for the micro cloud in question. In some embodiments, this aggregated locally trained model is then transmitted to a cloud or edge server for aggregation with the aggregated locally trained models from other micro clouds. The resulting global aggregated model is then distributed to the connected vehicles in preparation for the next iteration or training phase. In some embodiments, during aggregation, models from various vehicles are weighted differently depending on the quality of their associated sensor data.

In some embodiments, vehicles receive instructions, during the current training phase, that prepare them for possible participation as elected vehicles in the next training phase. For example, a connected vehicle can receive instructions such as speed advisories, lane-change requests, or rerouting requests to position the connected vehicle spatially to provide more advantageous sensor data for training the local model during the next training phase.

The techniques described above—the sharing of metadata among the vehicles in a given micro cloud, electing particular vehicles (e.g., a subset of the vehicles, in some situations) in a micro cloud to participate in horizontal collaboration (exchange of locally trained models), and preparing vehicles for the next training phase so that they are positioned advantageously to improve accuracy—results in federated learning models converging more rapidly and achieving a higher level of accuracy. This means that fewer iterations of federated learning are required and, therefore, fewer uploads and downloads to and from the cloud or edge server or among the connected vehicles are needed.

Figure 1:
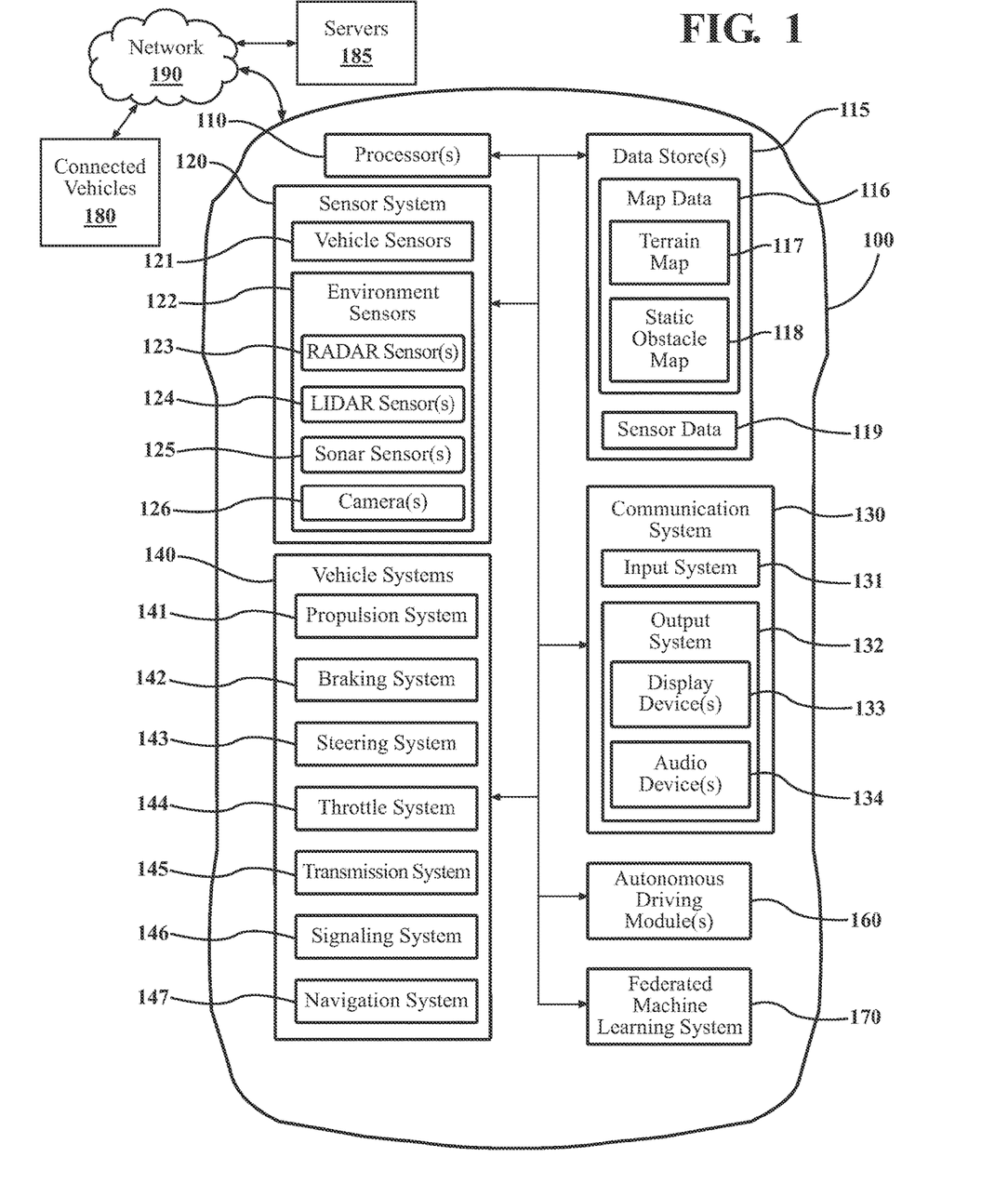
FIG. 1 illustrates one embodiment of a connected vehicle within which systems and methods disclosed herein may be implemented.

Referring to FIG. 1, an example of a connected vehicle 100, in which systems and methods disclosed herein can be implemented, is illustrated. As used herein, a "vehicle" is any form of motorized transport. One example of a "vehicle," without limitation, is an automobile. A "connected vehicle" is one that is capable of communicating with other nodes of a communication network (servers, infrastructure, other connected vehicles, etc.). In some embodiments, connected vehicle 100 can operate, at least some of the time, in a fully autonomous mode (e.g., what the automotive industry refers to as autonomy Levels 3-5, particularly Level 5). In other embodiments, connected vehicle 100 includes an intelligent driving assistance system such as an Advanced Driver-Assistance System (ADAS). In still other embodiments, connected vehicle 100 may be driven manually by a human driver. The connected vehicle 100 can include a federated machine learning system 170 or capabilities to support or interact with the federated machine learning system 170 and thus benefits from the functionality discussed herein. The federated machine learning system 170 in a connected vehicle 100 can interact with other connected vehicles and/or servers in a larger federated machine learning architecture that includes a plurality of micro clouds, as discussed further below. Instances of connected vehicle 100, as used herein, are equally applicable to any device capable of incorporating the systems or methods described herein.

The connected vehicle 100 also includes various elements. It will be understood that, in various implementations, it may not be necessary for the connected vehicle 100 to have all of the elements shown in FIG. 1. The connected vehicle 100 can have any combination of the various elements shown in FIG. 1. Further, the connected vehicle 100 can have additional elements to those shown in FIG. 1. In some arrangements, the connected vehicle 100 may be implemented without one or more of the elements shown in FIG. 1, including federated machine learning system 170. While the various elements are shown as being located within the connected vehicle 100 in FIG. 1, it will be understood that one or more of these elements can be located external to the connected vehicle 100. Further, the elements shown may be physically separated by large distances. As shown in FIG. 1, connected vehicle 100 may communicate with one or more other connected vehicles 180 (the same as or similar to connected vehicle 100) and/or one or more servers 185 via communication system 130 over a network 190. In some embodiments, network 190 includes the Internet.

Some of the possible elements of the connected vehicle 100 are shown in FIG. 1 and will be described in connection with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to connected vehicle 100. Note that the more general term "sensors," in some contexts herein, refers to the various sensors in sensor system 120 collectively, including vehicle sensors 121 and/or environment sensors 122. Sensor system 120 can also include one or more environment sensors 122.

Environment sensors 122 can include, without limitation, radar sensor(s) 123, Light Detection and Ranging (LIDAR) sensor(s) 124, sonar sensor(s) 125, and camera(s) 126. One or more of these various types of environment sensors 122 can be used to detect objects and, in other respects, understand the environment surrounding connected vehicle 100. This process is sometimes referred to as "scene understanding." In embodiments in which connected vehicle 100 is capable of semi-autonomous or fully autonomous operation, connected vehicle 100 includes autonomous driving module(s) 160 to control autonomous or semi-autonomous operation.

Figure 2:
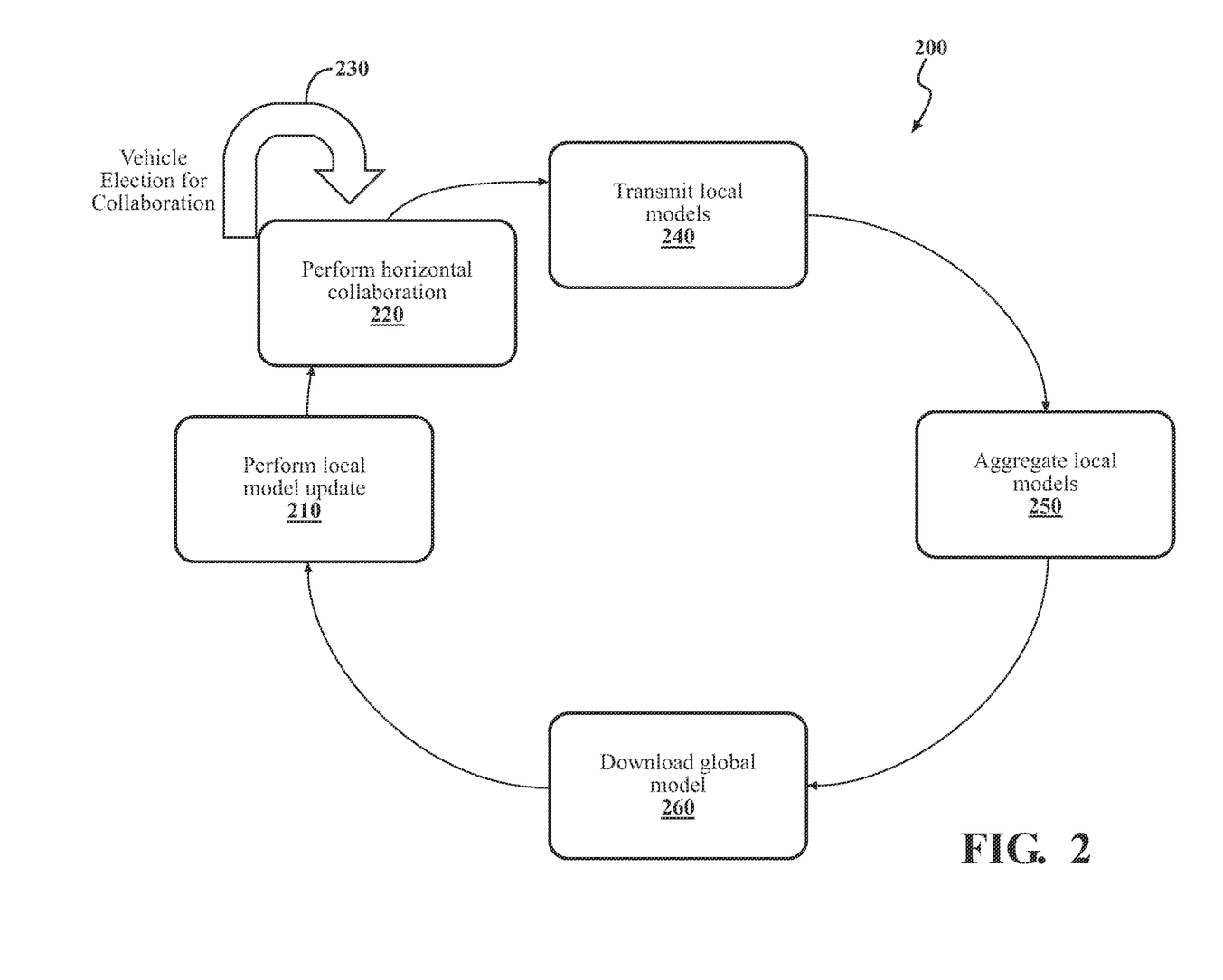
FIG. 2 is a diagram of a federated machine learning process, in accordance with an illustrative embodiment of the invention.

FIG. 2 is a diagram of a federated machine learning process 200, in accordance with an illustrative embodiment of the invention. FIG. 2 provides a high-level overview of the federated-learning process employed in various embodiments. At block 210, a federated machine learning system 170 in each of a plurality of connected vehicles 100 in one or more micro clouds trains its own local machine learning model to perform a task (e.g., object detection, object recognition, road-agent trajectory prediction, etc.) using local input data (e.g., vehicle and environment sensor data) to update the local model in that connected vehicle 100. At block 220, the connected vehicles 100 in a given micro cloud perform horizontal collaboration. That is, particular connected vehicles 100 in the micro cloud that have been elected to participate in the current training phase (arrow 230) based on an analysis of metadata shared among the members of the micro cloud exchange their locally trained machine learning models with one another to create an aggregated locally trained machine learning model. In some embodiments, the aggregated locally trained machine learning model is transmitted to a cloud or edge server for further aggregation with other aggregated locally trained machine learning models produced by other micro clouds. This is represented by block 250 in FIG. 2. The higher level aggregation process at block 250 produces an updated global model (block 260), which is distributed to the connected vehicles 100 in preparation for the next training phase of the federated machine learning process 200. In other embodiments lacking a centralized cloud/edge server, the vehicles themselves can perform the further aggregation at block 250 in a distributed fashion and disseminate the updated global model to one another (this is analogous to block 260).

Figure 3:
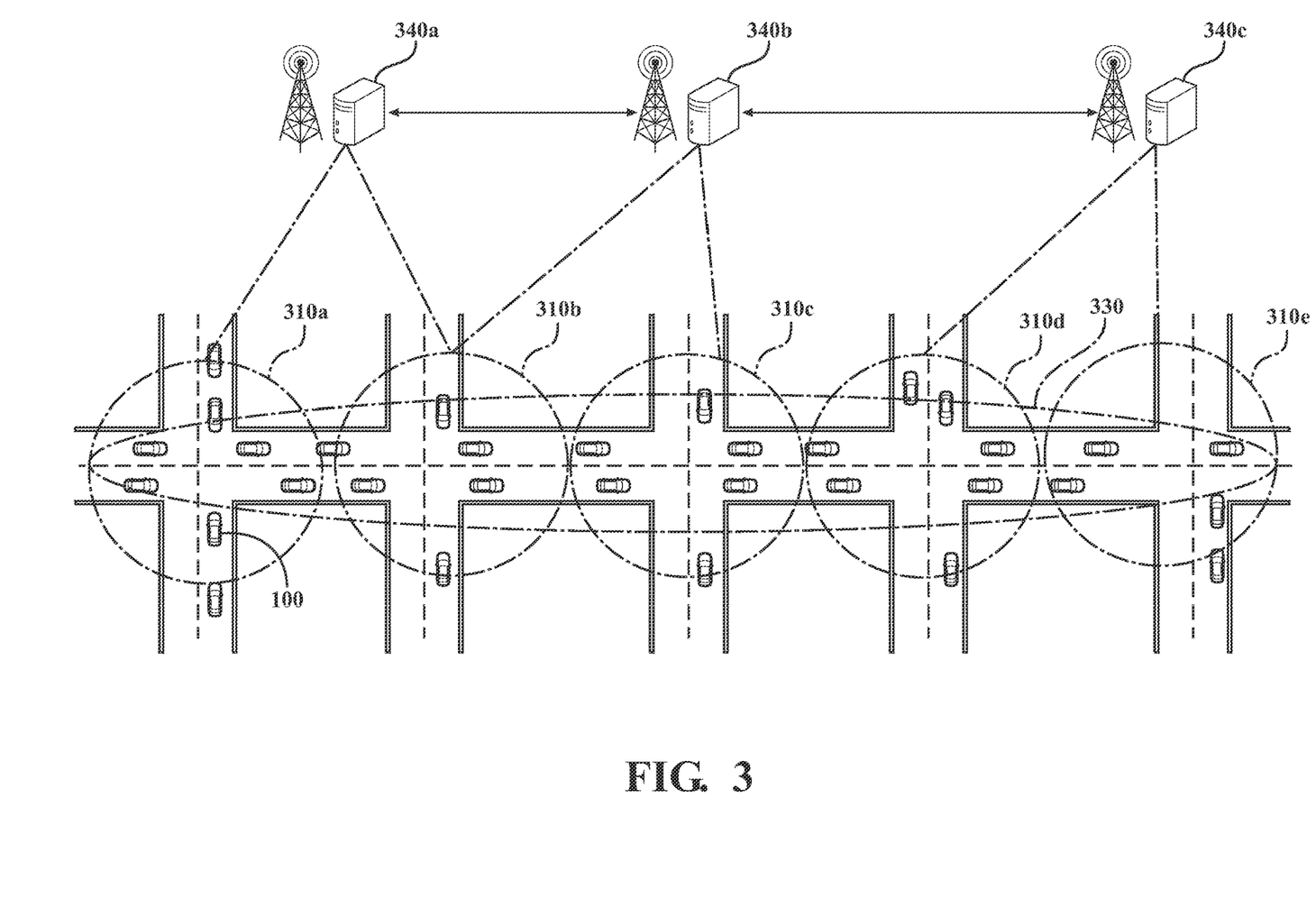
FIG. 3 is a diagram of a federated machine learning architecture, in accordance with an illustrative embodiment of the invention.

FIG. 3 is a diagram of a federated machine learning architecture 300, in accordance with an illustrative embodiment of the invention. As shown in FIG. 3, federated machine learning architecture 300 includes vehicular micro clouds 310a-e that collectively make up a vehicular macro cloud 330. In general, a vehicular micro cloud 310 is a vehicular ad hoc network (VANET) formed as vehicles near one another travel along a roadway. As discussed above, the connected vehicles 100 within a given micro cloud 310 can communicate with one another via V2V communication links without necessarily having to rely on an intermediate communication node such as a server. As those skilled in the art will understand, all the vehicles in a given vehicular micro cloud 310 do not necessarily have to communicate directly with one another, depending on the particular embodiment. In some embodiments, for example, a communication topology such as a multi-hop mesh network can be used.

In some embodiments, in each micro cloud 310, a particular connected vehicle 100 is designated as the cloud leader (CL) (not labeled in FIG. 3). The CL coordinates communication among the members of the applicable vehicular micro cloud 310 and, in some embodiments, is responsible for certain decision-making tasks that involve coordination among the micro clouds 310. For example, in some embodiments, the CLs can coordinate the vehicular macro cloud 300 communication. More specifically, a CL (a designated connected vehicle 100) can be equipped with a LTE or other cellular-data interface to directly communicate with a server 340 and elect some gateway nodes to reach nearby vehicular micro clouds 310. Through such an architecture, the network connectivity is maximized, and the connected vehicles 100 can be proactively prepared for the upcoming federated machine learning tasks. In some embodiments, the connected vehicle 100 receives instructions to prepare the connected vehicle 100 for the next training phase of the federated machine learning process through coordination among a CL of the vehicular micro cloud 310 in which connected vehicle 100 is currently located and at least one other CL of a different vehicular micro cloud 310 within the same vehicular macro cloud 330.

As shown in FIG. 3, in some embodiments, the connected vehicles 100 in the respective vehicular micro clouds 310a-e can communicate with one or more of the cloud/edge servers 340a-c. In an embodiment such as that shown in FIG. 3, in which there are cloud/edge servers 340, the cloud/edge servers 340 perform functions such as (1) initiating a federated learning process (the series of iterations or training phases executed within the federated machine learning architecture 300 to train a machine-learning model to perform a particular task); (2) analyzing metadata shared by the connected vehicles 100 to determine which vehicles in a given micro cloud should be elected for horizontal collaboration during the current training phase and to determine what preparatory instructions should be sent to the various connected vehicles 100 to prepare them spatially (e.g., through instructions that strategically position the connected vehicles 100) for participation in the next training phase; (3) further aggregating the aggregated locally trained models received from the vehicular micro clouds 310a-e to produce the updated global model discussed above; and (4) distributing the updated global model to the connected vehicles 100 in the various vehicular micro clouds 310 in preparation for the next training phase of the federated machine learning process. In other embodiments, these functions performed by cloud/edge servers 340 are performed by the connected vehicles 100 themselves in a distributed fashion (e.g., through use of consensus algorithms and/or coordination among the CLs in the respective micro clouds).

Figure 4:
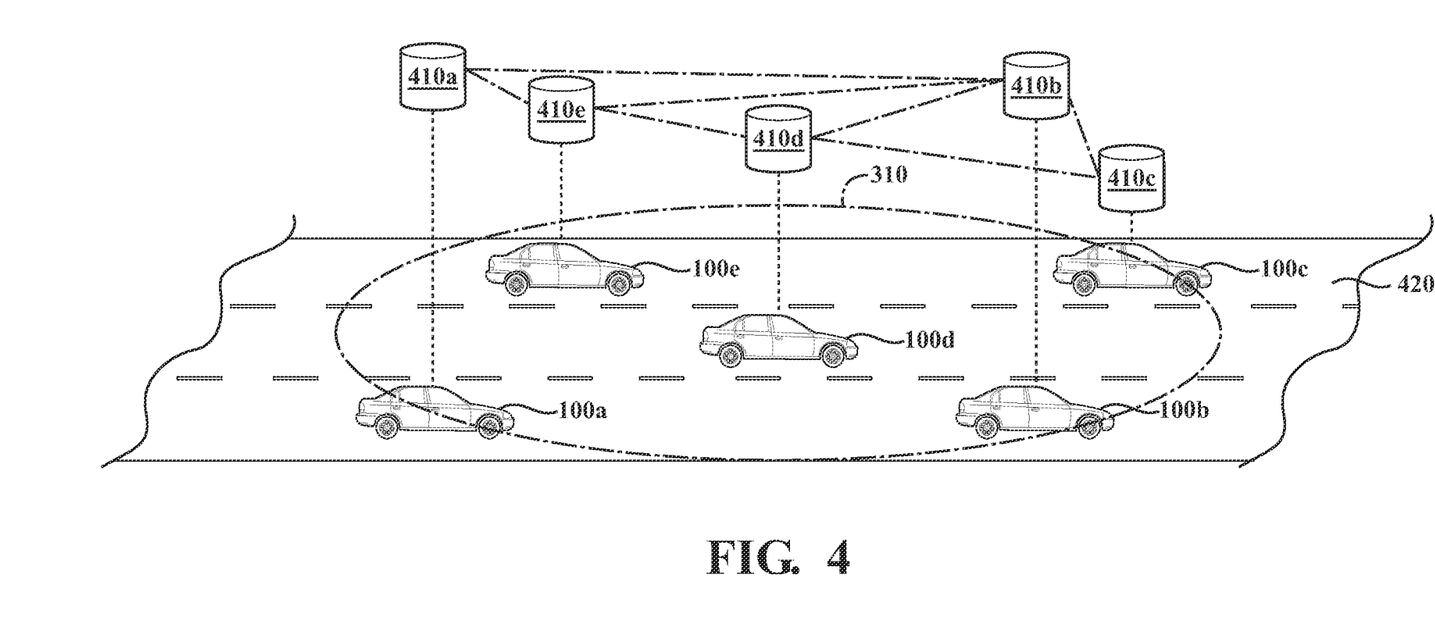
FIG. 4 illustrates a vehicular micro cloud, in accordance with an illustrative embodiment of the invention.

FIG. 4 illustrates a vehicular micro cloud 310, in accordance with an illustrative embodiment of the invention. As shown in FIG. 4, vehicular micro cloud 310 includes connected vehicles 100a-e traveling along a roadway 420. The connected vehicles 100a-e each have, respectively, associated metadata 410a-e. In this context, "metadata" refers to information regarding the sensor capabilities of a given connected vehicle 100 and, in some embodiments, other information that is pertinent to the federated learning process. For example, in some embodiments, the metadata 410 concerns the following: (1) the types of sensors (e.g., vehicle sensors 121 and/or environment sensors 122) available at a particular connected vehicle 100; (2) the capabilities of specific available sensors at that connected vehicle 100; and/or (3) the quality of the specific available sensors. For example, the metadata 410a for connected vehicle 100a might indicate that the vehicle has front, rear, and side cameras 126 of specified image resolution and specifications; a particular type of LIDAR sensors 124 with certain specifications and performance characteristics; and a particular type of radar sensors 123 with specified performance capabilities.

Additionally, in some embodiments, if a connected vehicle 100 is a public-transportation vehicle (e.g., a bus), the vehicle's itinerary (e.g., scheduled stops at specified locations) can be included among the metadata 410 associated with the bus. Such itinerary information can be useful in preparing such a vehicle for the next training phase. For example, an analysis of the metadata might determine that the bus being in a particular location (i.e., at a scheduled stop) during the next training phase is advantageous from the standpoint of acquiring certain kinds of sensor data for training the machine learning model. In a different embodiment, if it is known that the bus will stop at a certain location, federated machine learning system 170 can leverage the bus as a "data mule." That is, correlated data can be stored at the bus, and the bus can deliver the data on the way to a stop or while it is stopped.

In some embodiments, the metadata 410 can include information about roadways, their characteristics, and associated statistics. Metadata 410 can also include information and observations about the environment that the connected vehicles 100 gather through their vehicle sensors 121, environment sensors 122, or from other sources (e.g., via network 190).

As discussed above, the metadata 410 is analyzed to determine which connected vehicles 100 in a given micro cloud should be elected for participation in the current training phase. In general, this involves considering various possible subsets of vehicles in the micro cloud and calculating which vehicles' participation and exchange of locally trained models would maximize the accuracy of the resulting aggregated locally trained machine learning model produced by that micro cloud during the current training phase. Some factors influencing election can include a particular connected vehicle's sensor capabilities, its position on the roadway, etc. As discussed above, the analysis of metadata 410 can be performed at a cloud/edge server 340 (e.g., based on information received from the CLs in the respective micro clouds 310), or it can be performed by the connected vehicles 100 themselves in a distributed fashion (e.g., by consensus or other collaborative algorithm). In some embodiments, the cloud/edge server 340 or the connected vehicles 100 can employ one or more machine-learning-based models to infer information from the metadata 410. For example, in some embodiments, clustering techniques can be applied to infer information from the sensor data.

Mathematically, the global aggregation process can be represented as $$w_{t+1} \leftarrow \frac{1}{\sum_k c_k} \sum_k c_k w_k^t,$$

where $w_t$ is the global model after t iterations, the $c_k$ are weights based on the quality of the sensor data, as determined from the metadata 410, and the $w_k^t$ are the parameters of the machine learning model at each connected vehicle k after t iterations.

In some embodiments, the datasets at the respective connected vehicles k are defined as $X_k = \{(x_i, y_i); i=1, \ldots, c_k\}$, and the loss function can be defined as $F_{w_t^k}(x_i, y_i)$ so that a gradient update is represented as $g_t^k = \eta \Sigma_{(x_i, y_i) \in x^k} \nabla F_{w_t^k}(x_i, y_i)$. Using this notation, an update of the locally trained machine learning model at a connected vehicle k can be expressed for i=1, . . . , E, where E is the number of iterations or training phases, as $w_t^k \leftarrow w_t^k + g_t^k$.

As discussed above, in some embodiments, one of the connected vehicles 100a-e is designated as the CL of the vehicular micro cloud 310. This can be done by a cloud/edge server 340, in some embodiments, or by consensus among the connected vehicles 100 themselves, in other embodiments.

As discussed above, one way in which the embodiments disclosed herein improve on conventional federated learning approaches is preparing connected vehicles 100 for the next training phase by transmitting instructions to the vehicles that position them advantageously (e.g., so that their sensors can provide information or detect particular objects/features of interest to the model-training process). Such strategic advance placement of the connected vehicles is particularly advantageous if the connected vehicles 100 are autonomous vehicles because such vehicles can readily respond to the received instructions. Examples of instructions to position the connected vehicles 100 include, without limitation, a speed advisory (a recommendation to travel at a particular speed), a lane-change request, and a rerouting request. In some embodiments, whether a connected vehicle 100 is able to carry out a requested preparation instruction can be a factor in whether that connected vehicle 100 ends up being elected to participate in the next training phase.

Figure 5:
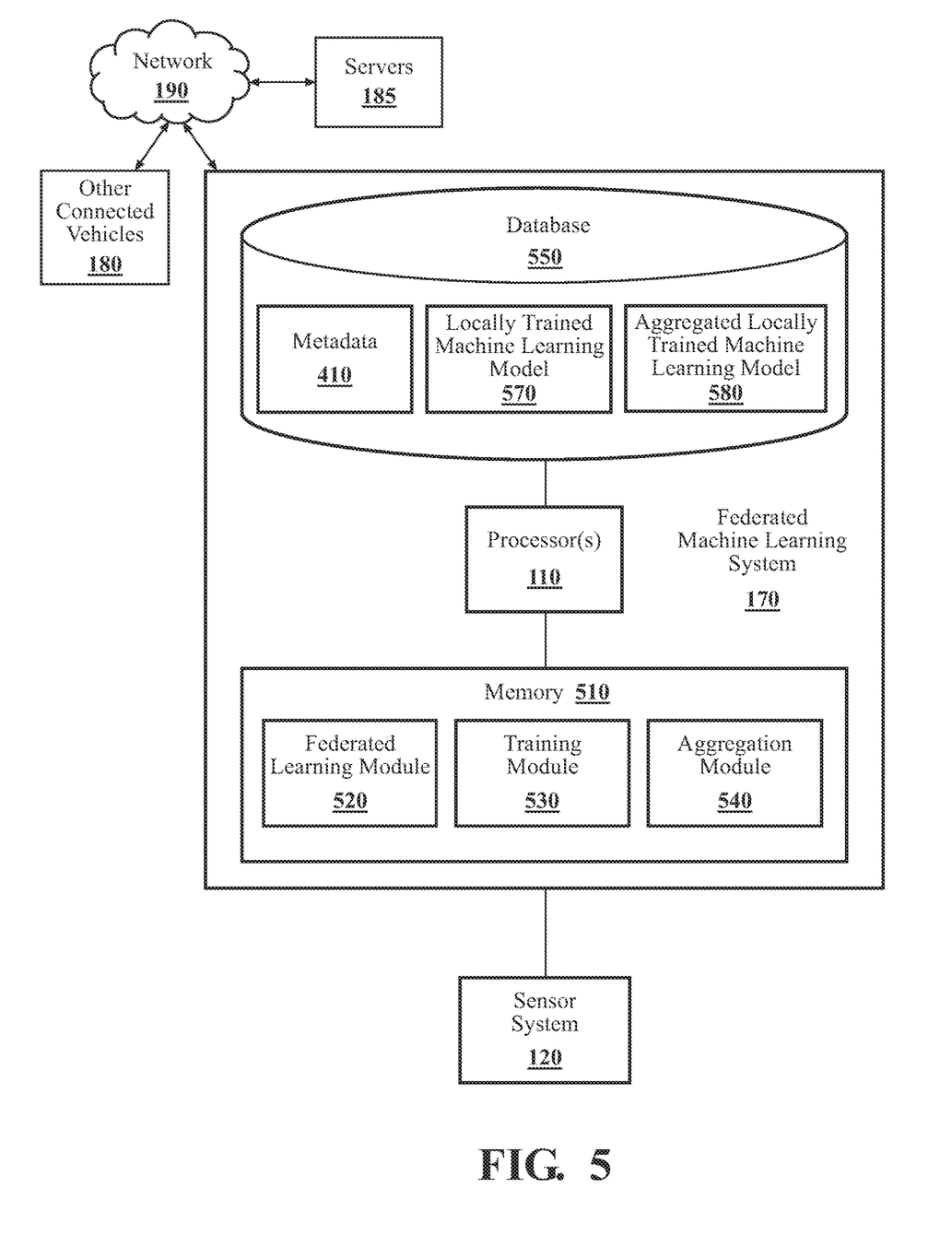
FIG. 5 is a block diagram of a federated machine learning system, in accordance with an illustrative embodiment of the invention.

Referring to FIG. 5, it is a block diagram of a federated machine learning system 170, in accordance with an illustrative embodiment of the invention. In this embodiment, federated machine learning system 170 is shown as including one or more processors 110 from the connected vehicle 100 of FIG. 1. In general, the one or more processors 110 may be a part of federated machine learning system 170, federated machine learning system 170 may include one or more separate processors from the one or more processors 110 of the connected vehicle 100, or federated machine learning system 170 may access the one or more processors 110 through a data bus or another communication path, depending on the embodiment.

In one embodiment, memory 510 stores a federated learning module 520, a training module 530, and an aggregation module 540. The memory 510 is a random-access memory (RAM), read-only memory (ROM), a hard-disk drive, a flash memory, or other suitable memory for storing the modules 520, 530, and 540. The modules 520, 530, and 540 are, for example, computer-readable instructions that when executed by the one or more processors 110, cause the one or more processors 110 to perform the various functions disclosed herein.

As shown in FIG. 5 and as discussed above, federated machine learning system 170 can communicate with one or more other connected vehicles 180 and, in some embodiments, with one or more servers 185 (e.g., cloud and/or edge servers) via network 190. Federated machine learning system 170 can also interface and communicate with sensor system 120. In communicating with other connected vehicles 180, a connected vehicle 100 can employ DSRC, Wi-Fi, or mmWave technology to establish V2V communication links. In communicating with servers 185, a connected vehicle 100 can employ technologies such as cellular data. Though not shown in FIG. 5, federated machine learning system 170, in communicating with other network nodes, can do so via communication system 130 (refer to FIG. 1).

Federated machine learning system 170 can store metadata 410, a locally trained machine learning model 570, and an aggregated locally trained machine learning model 580 in a database 550.

Federated learning module 520 generally includes instructions that when executed by the one or more processors 110 cause the one or more processors 110 to transmit, after initiation of a federated machine learning process, first metadata 410 from a connected vehicle 100 to at least one other connected vehicle 180 (i.e., at least one other vehicle the same as or similar to connected vehicle 100). As discussed above, the connected vehicle 100 and the at least one other connected vehicle 180 are both members of a vehicular micro cloud 310 of networked vehicles, and the first metadata 410 includes information regarding the sensor capabilities of the connected vehicle 100. As discussed above, in some embodiments, the first metadata 410 can include other kinds of relevant information.

Federated learning module 520 also includes instructions that when executed by the one or more processors 110 cause the one or more processors 110 to receive, at the connected vehicle 100, second metadata 410 from the at least one other connected vehicle 180, the second metadata 410 including information regarding the sensor capabilities of the at least one other connected vehicle 180. In other words, the connected vehicles 100/180 in a given micro cloud 310 can exchange their metadata 410 with one another to support the analysis determining the election of particular connected vehicles 100/180 in the micro cloud 310 to participate in the current training phase and the generation of the preparation instructions that are transmitted to connected vehicles 100/180 to advantageously position them for the next training phase, as discussed above.

Federated learning module 520 also includes instructions that when executed by the one or more processors 110 cause the one or more processors 110 to receive, at the connected vehicle 100 based on an analysis of the first and second metadata 410, a notification that the connected vehicle 100 has been elected to participate in the current training phase of the federated machine learning process. As discussed above, the metadata 410 can be analyzed at the connected vehicles 100/180 themselves, or it can be analyzed by a cloud/edge server 340, depending on the particular embodiment. That is, both centralized and distributed federated machine learning architectures employing the techniques disclosed herein are possible.

Federated learning module 520 also includes instructions that when executed by the one or more processors 110 cause the one or more processors 110 to receive, at the connected vehicle 100, instructions to prepare the connected vehicle 100 for the next training phase of the federated machine learning process. As discussed above, those instructions can include, without limitation, a speed advisory, a lane-change request, and a rerouting request. The purpose of the preparation instructions, in some embodiments, is to more advantageously position the connected vehicle 100 for the next training phase (e.g., to make it possible for the vehicle's sensors to detect objects/features in the environment that are pertinent to the machine-learning-model training process).

Training module 530 generally includes instructions that when executed by the one or more processors 110 cause the one or more processors 110 to train a machine learning model to perform a task at the connected vehicle 100 during the current training phase to produce a locally trained machine learning model 570. The details of the locally trained machine learning module 570 depend on the particular task/application of interest. Examples include, without limitation, object detection, object recognition, and trajectory prediction, as discussed above.

Aggregation module 540 generally includes instructions that when executed by the one or more processors 110 cause the one or more processors 110 to submit the locally trained machine learning model 570 for aggregation with at least one other locally trained machine learning model produced by at least one other elected vehicle in the vehicular micro cloud 310 to produce an aggregated locally trained machine learning model 580. As discussed above, the further aggregation of the aggregated locally trained machine learning models 580 produced by the respective micro clouds 310 to produce an updated global machine learning model can be performed at a cloud/edge server 340, or it can be performed in a distributed fashion by the connected vehicles 100/180 themselves.

The timeframe in which a training phase is completed varies, depending on the particular embodiment. In some embodiments, a training phase in support of a simple task may occupy a period on the order of seconds, whereas a training phase in support of a more complex task may require a period on the order of minutes. In some embodiments, the training phases, once a federated machine learning process has commenced, are periodic in time. In other embodiments, the training phases occur at irregular intervals.

Figure 6:
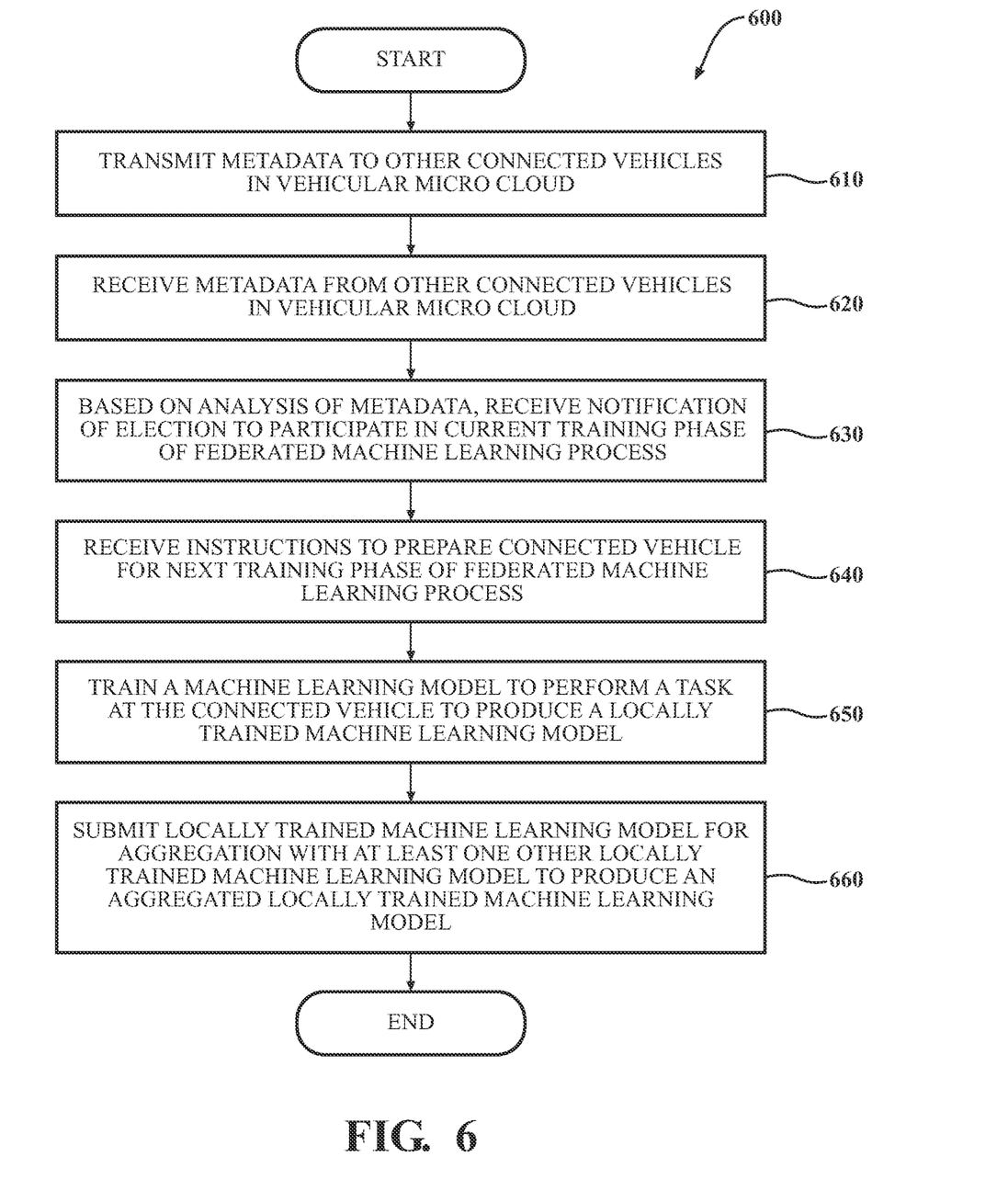
FIG. 6 is a flowchart of a method of vehicular-network-assisted federated machine learning, in accordance with an illustrative embodiment of the invention.

FIG. 6 is a flowchart of a method 600 of vehicular-network-assisted federated machine learning, in accordance with an illustrative embodiment of the invention. Method 600 will be discussed from the perspective of the federated machine learning system 170 in FIG. 5. While method 600 is discussed in combination with federated machine learning system 170, it should be appreciated that method 600 is not limited to being implemented within federated machine learning system 170, but federated machine learning system 170 is instead one example of a system that may implement method 600.

At block 610, federated learning module 520 transmits, after initiation of a federated machine learning process, first metadata 410 from a connected vehicle 100 to at least one other connected vehicle 180. As discussed above, the connected vehicle 100 and the at least one other connected vehicle 180 are members of a vehicular micro cloud 310 of networked vehicles, and the first metadata 410 includes information regarding the sensor capabilities of the connected vehicle 100. As discussed above, metadata 410, in some embodiments, includes information such as the following: (1) the types of sensors (e.g., vehicle sensors 121 and/or environment sensors 122) available at a particular connected vehicle 100; (2) the capabilities of specific available sensors at that connected vehicle 100; and/or (3) the quality of the specific available sensors. Additionally, in some embodiments, if a connected vehicle 100 is a public-transportation vehicle (e.g., a bus), the vehicle's itinerary (e.g., scheduled stops at specified locations) can be included among the metadata 410 associated with the bus. As also discussed above, in some embodiments, the metadata 410 can include information about roadways, their characteristics, and associated statistics. Metadata 410 can also include information and observations about the environment that the connected vehicles 100/180 gather through their vehicle sensors 121 or from other sources (e.g., via network 190).

At block 620, federated learning module 520 receives, at the connected vehicle 100, second metadata 410 from the at least one other connected vehicle 180, the second metadata 410 including information regarding the sensor capabilities of the at least one other connected vehicle 180. The discussion of the "first metadata 410" above also applies to the "second metadata 410." However, since the sensor capabilities of connected vehicle 100 and the at least one other connected vehicle 180 may differ, the first metadata 410 is not necessarily the same as the second metadata 410.

At block 630, federated learning module 520 receives, at the connected vehicle 100 based on an analysis of the first and second metadata 410, a notification that the connected vehicle 100 has been elected to participate in the current training phase of the federated machine learning process. As discussed above, the first and second metadata 410 can be analyzed at the connected vehicles 100/180 themselves, or it can be analyzed by a cloud/edge server 340, depending on the embodiment. As also discussed above, in some embodiments, one or more machine-learning-based models can be used in analyzing the metadata 410 to infer information from the metadata 410.

At block 640, federated learning module 520 receives, at the connected vehicle 100, instructions to prepare the connected vehicle 100 for the next training phase of the federated machine learning process. As discussed above, those instructions can include, without limitation, a speed advisory, a lane-change request, and a rerouting request. The purpose of the preparation instructions, in some embodiments, is to more advantageously position the connected vehicle 100 for the next training phase (e.g., to make it possible for the vehicle's sensors to detect objects/features in the environment that are pertinent to the machine-learning-model training process).

As discussed above, in some embodiments, the CLs in the micro clouds 310 can coordinate the vehicular macro cloud 300 communication. More specifically, a CL (a designated connected vehicle 100) can be equipped with a LTE or other cellular-data interface to directly communicate with a server 340 and elect some gateway nodes to reach nearby vehicular micro clouds 310. Through such an architecture, the network connectivity is maximized, and the connected vehicles 100 can be proactively prepared for the upcoming federated machine learning tasks. For example, in such an embodiment the vehicular micro cloud 310 can communicate with other vehicular micro clouds 310 via their CLs, and the CLs can arrange which vehicles can meet at which locations. In summary, as also discussed above, in some embodiments, the connected vehicle 100 receives instructions to prepare the connected vehicle 100 for the next training phase of the federated machine learning process through coordination among a CL of the vehicular micro cloud 310 in which connected vehicle 100 is currently located and at least one other CL of a different vehicular micro cloud 310 within the same vehicular macro cloud 330.

At block 650, training module 530 trains a machine learning model to perform a task at the connected vehicle during the current training phase to produce a locally trained machine learning model 570. The details of the locally trained machine learning module 570 (type of neural networks, their topology, etc.) depend on the particular task/application of interest. Examples include, without limitation, machine learning models for object detection, object recognition, and trajectory prediction, as discussed above.

At block 660, aggregation module 540 submits the locally trained machine learning model 570 for aggregation with at least one other locally trained machine learning model produced by at least one other elected vehicle in the vehicular micro cloud 310 to produce an aggregated locally trained machine learning model 580. As discussed above, the further aggregation of the aggregated locally trained machine learning models 580 produced by the respective micro clouds 310 to produce an updated global machine learning model can be performed at a cloud/edge server 340, or it can be performed in a distributed fashion by the connected vehicles 100/180 themselves.

FIG. 1 will now be discussed in full detail as an example vehicle environment within which the systems and methods disclosed herein may be implemented. In some instances, the connected vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the connected vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the connected vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the connected vehicle 100 along a travel route. Thus, in one or more implementations, the connected vehicle 100 operates autonomously according to a particular defined level of autonomy.

The connected vehicle 100 can include one or more processors 110. In one or more arrangements, the one or more processors 110 can be a main processor of the connected vehicle 100. For instance, the one or more processors 110 can be an electronic control unit (ECU). The connected vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the connected vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, connected vehicle 100 can receive sensor data from other connected vehicles, from devices associated with ORUs, or both.

As noted above, the connected vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the connected vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the connected vehicle 100 itself, including the operational status of various vehicle components and systems.

In one or more arrangements, the vehicle sensors 121 can be configured to detect, and/or sense position and/or orientation changes of the connected vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the connected vehicle 100. In one or more arrangements, the vehicle sensors 121 can include a speedometer to determine a current speed of the connected vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the connected vehicle 100 and/or information/data about such obstacles. The one or more environment sensors 122 can be configured to detect, measure, quantify, and/or sense other things in at least a portion the external environment of the connected vehicle 100, such as, for example, nearby vehicles, lane markers, signs, traffic lights, traffic signs, lane lines, crosswalks, curbs proximate the connected vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the connected vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The connected vehicle 100 can further include a communication system 130. The communication system 130 can include one or more components configured to facilitate communication between the connected vehicle 100 and one or more communication sources. Communication sources, as used herein, refers to people or devices with which the connected vehicle 100 can communicate with, such as external networks, computing devices, operator or occupants of the connected vehicle 100, or others. As part of the communication system 130, the connected vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The connected vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The connected vehicle 100 can include one or more vehicle systems 140. Various examples of the one or more vehicle systems 140 are shown in FIG. 1. However, the connected vehicle 100 can include more, fewer, or different vehicle systems. It should be appreciated that although particular vehicle systems are separately defined, each or any of the systems or portions thereof may be otherwise combined or segregated via hardware and/or software within the connected vehicle 100. The connected vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the connected vehicle 100. The one or more processors 110 and/or the autonomous driving module(s) 160 may control some or all of these vehicle systems 140 and, thus, may be partially or fully autonomous.

The connected vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the connected vehicle 100 can include one or more autonomous driving modules 160. The autonomous driving module(s) 160 can be configured to receive data from the sensor system 120 and/or any other type of system capable of capturing information relating to the connected vehicle 100 and/or the external environment of the connected vehicle 100. In one or more arrangements, the autonomous driving module(s) 160 can use such data to generate one or more driving scene models. The autonomous driving module(s) 160 can determine the position and velocity of the connected vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the connected vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the connected vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the connected vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-6, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for vehicular-network-assisted federated machine learning, the system comprising:
a processor; and
a memory storing computer-readable instructions that, when executed by the processor, cause the processor to:
exchange metadata between a connected vehicle and at least one other connected vehicle in a vehicular micro cloud, wherein the metadata includes information regarding sensor capabilities of the connected vehicle and the at least one other connected vehicle;
receive, at the connected vehicle based on an analysis of the metadata, a notification that the connected vehicle has been elected to participate in a current training phase of a federated machine learning process;
receive, at the connected vehicle, instructions that position the connected vehicle to provide information about an object of interest to the federated machine learning process;
train a machine learning model to perform a task at the connected vehicle during the current training phase to produce a locally trained machine learning model; and
submit the locally trained machine learning model for aggregation with at least one other locally trained machine learning model produced by at least one other elected vehicle in the vehicular micro cloud to produce an aggregated locally trained machine learning model that is used as a starting point for a next training phase of the federated machine learning process.

2. The system of claim 1, wherein the metadata includes information regarding at least one of availability of particular types of sensors, capabilities of specific available sensors, quality of the specific available sensors, and an itinerary that includes scheduled stops.

3. The system of claim 1, wherein the connected vehicle receives the instructions that position the connected vehicle through coordination among a cloud leader of the vehicular micro cloud and at least one other cloud leader of a different vehicular micro cloud within a same vehicular macro cloud.

4. The system of claim 1, wherein the analysis of the metadata is performed at one of a cloud server and an edge server, the analysis of the metadata resulting in the connected vehicle being elected to participate in the current training phase of the federated machine learning process.

5. The system of claim 1, wherein the analysis of the metadata is performed at the connected vehicle and the at least one other connected vehicle in a distributed fashion, the analysis of the metadata resulting in the connected vehicle being elected to participate in the current training phase of the federated machine learning process.

6. The system of claim 1, wherein the connected vehicle and the at least one other connected vehicle communicate via one or more vehicle-to-vehicle (V2V) communication links.

7. The system of claim 1, wherein the aggregated locally trained machine learning model is further aggregated with at least one other aggregated locally trained machine learning model from another vehicular micro cloud at one of a cloud server and an edge server in preparation for the next training phase of the federated machine learning process.

8. The system of claim 1, wherein the connected vehicle is an autonomous vehicle.

9. A non-transitory computer-readable medium for vehicular-network-assisted federated machine learning and storing instructions that, when executed by a processor, cause the processor to:

exchange metadata between a connected vehicle and at least one other connected vehicle in a vehicular micro cloud, wherein the metadata includes information regarding sensor capabilities of the connected vehicle and the at least one other connected vehicle;

receive, at the connected vehicle based on an analysis of the metadata, a notification that the connected vehicle has been elected to participate in a current training phase of a federated machine learning process;

receive, at the connected vehicle, instructions that position the connected vehicle to provide information about an object of interest to the federated machine learning process;

train a machine learning model to perform a task at the connected vehicle during the current training phase to produce a locally trained machine learning model; and submit the locally trained machine learning model for aggregation with at least one other locally trained machine learning model produced by at least one other elected vehicle in the vehicular micro cloud to produce an aggregated locally trained machine learning model that is used as a starting point for a next training phase of the federated machine learning process.

10. The non-transitory computer-readable medium of claim 9, wherein the metadata includes information regarding at least one of availability of particular types of sensors, capabilities of specific available sensors, quality of the specific available sensors, and an itinerary that includes scheduled stops.

11. A method, comprising:

exchanging metadata between a connected vehicle and at least one other connected vehicle in a vehicular micro cloud, wherein the metadata includes information regarding sensor capabilities of the connected vehicle and the at least one other connected vehicle;

receiving, at the connected vehicle based on an analysis of the metadata, a notification that the connected vehicle has been elected to participate in a current training phase of a federated machine learning process;

receiving, at the connected vehicle, instructions that position the connected vehicle to provide information about an object of interest to the federated machine learning process;

training a machine learning model to perform a task at the connected vehicle during the current training phase to produce a locally trained machine learning model; and submitting the locally trained machine learning model for aggregation with at least one other locally trained machine learning model produced by at least one other elected vehicle in the vehicular micro cloud to produce an aggregated locally trained machine learning model that is used as a starting point for a next training phase of the federated machine learning process.

12. The method of claim 11, wherein the metadata includes information regarding at least one of availability of particular types of sensors, capabilities of specific available sensors, quality of the specific available sensors, and an itinerary that includes scheduled stops.

13. The method of claim 11, wherein the analysis of the metadata is performed at one of a cloud server and an edge server, the analysis of the metadata resulting in the connected vehicle being elected to participate in the current training phase of the federated machine learning process.

14. The method of claim 11, wherein the analysis of the metadata is performed at the connected vehicle and the at least one other connected vehicle in a distributed fashion, the analysis of the first and second metadata resulting in the connected vehicle being elected to participate in the current training phase of the federated machine learning process.

15. The method of claim 11, wherein the connected vehicle and the at least one other connected vehicle communicate via one or more vehicle-to-vehicle (V2V) communication links.

16. The method of claim 11, wherein the aggregated locally trained machine learning model is further aggregated with at least one other aggregated locally trained machine learning model from another vehicular micro cloud at one of a cloud server and an edge server in preparation for the next training phase of the federated machine learning process.

* * * * *